US008239399B2

(12) United States Patent
Govani et al.

(10) Patent No.: US 8,239,399 B2
(45) Date of Patent: Aug. 7, 2012

(54) PROVIDING TOOLS FOR NAVIGATIONAL SEARCH QUERY RESULTS

(75) Inventors: Tabreez Govani, Mukilteo, WA (US); Jamie Buckley, Redmond, WA (US); Natalia Burina, Redmond, WA (US); Hemant Banavar, Kirkland, WA (US); Hugh Williams, Redmond, WA (US); Nitin Agrawal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 12/465,792

(22) Filed: May 14, 2009

(65) Prior Publication Data

US 2010/0293178 A1 Nov. 18, 2010

(51) Int. Cl.
*G06F 17/00* (2006.01)

(52) U.S. Cl. ........................................................ 707/759

(58) Field of Classification Search .................. 707/759, 707/783, 769
See application file for complete search history.

(56) References Cited

U.S. PATENT DOCUMENTS

| | | | | |
|---|---|---|---|---|
| 7,275,085 | B1 | 9/2007 | Minh | |
| 7,698,327 | B2 * | 4/2010 | Kapur | 707/706 |
| 2006/0248060 | A1 * | 11/2006 | Silverberg et al. | 707/3 |
| 2006/0265417 | A1 | 11/2006 | Amato | |
| 2007/0100650 | A1 | 5/2007 | Ramer | |
| 2008/0010262 | A1 | 1/2008 | Frank | |
| 2008/0114759 | A1 * | 5/2008 | Yahia et al. | 707/6 |
| 2008/0306933 | A1 | 12/2008 | Valliani | |

OTHER PUBLICATIONS http://www.google.com/search?hl=en&q=wikipedia&aq=f &oq=Wikipedia—Google Search; May 12, 2009.
Live Search to get New Brand, Features http://searchenginewatch.com/__subscribers/topics/&bname=microsoft__live__search.
Search Engines http://www.bespacific.com/mt/archives/cat__search__engines.html.
Consumer Source, Inc. http://investing.businessweek.com/research/stocks/private/snapshot.asp?privcapld=1023159.
Primedia Makes Finding a Place to Live Easier with Enhanced Web Offerings http://www.allbusiness.com/real-estate/commercial-residential-property/11684358-1.html.

* cited by examiner

*Primary Examiner* — James Trujillo
*Assistant Examiner* — Mohsen Almani
(74) *Attorney, Agent, or Firm* — Shook, Hardy & Bacon LLP

(57) ABSTRACT

Methods and computer-readable media are provided for displaying a target search result and relevant information on a search results page in response to a user-inputted query on a search page. The target search result and relevant information are identified in a database as having been previously determined to be most relevant to the query, and may be based on past user behavior, for example. The relevant information may include functional tools that include input boxes allowing for the user to interact with a webpage associated with the target search result via the search results page. Once the target search result and relevant information have been determined, the search results page is displayed.

20 Claims, 10 Drawing Sheets

600
SEARCH DELTA 610
WEB 1-10 OF 94,100,000 RESULTS ADVANCED
SEE ALSO: IMAGES, VIDEO, NEWS, MAPS, MORE
612 BEST MATCH
614 DELTA AIR LINES – AIRLINE TICKETS AND AIRFARE TO WORLDWIDE ...
WWW.DELTA.COM
AIRLINE TICKETS, FLIGHT SCHEDULES, AND AIR TRAVEL DEALS TO DESTINATIONS WORLDWIDE AT DELTA.COM.
FLIGHT STATUS FLIGHT SCHEDULES
RESERVATIONS SPECIALS
BAGGAGE INFORMATION TRIP PLANNING
CHECK IN ONLINE CONTACT
616
618 CUSTOMER SERVICE: 800-221-1212
624 SITES LIKE THIS
SOUTHWEST AIRLINES
CONTINENTAL AIRLINES
UNITED AIRLINES
NORTHWEST AIRLINES
AIRTRAN
FLIGHT STATUS
SEARCH BY:
FLIGHT CARRIER FLIGHT NUMBER FLIGHT DATE
OR
FROM AIRPORT TO AIRPORT GO
620
DELTA AIR LINES BLOG
THROUGH THIS SUNDAY ON OUR U.S. FLIGHTS, LOOK FOR FLIGHT ATTENDANTS WEARING THEIR DELTA A...
BLOG DELTA.COM - CACHED PAGE
DELTA IV – WIKIPEDIA, THE FREE ENCYCLOPEDIA
DELTA IV IS AN ACTIVE EXPENDABLE LAUNCH SYSTEM IN THE DELTA ROCKET FAMILY DELTA IV USES ...
VEHICLE DESCRIPTION – VARIANTS – LAUNCH SITES – VEHICLE PROCESSING – HISTORY
EN.WIKIPEDIA.ORG/WIKI/DELTA_IV – CACHED PAGE
622

I/O PORT(S)
118
I/O COMPONENTS
120
POWER SUPPLY
122

110
MEMORY
112
PROCESSOR(S)
114
PRESENTATION COMPONENT(S)
116
100

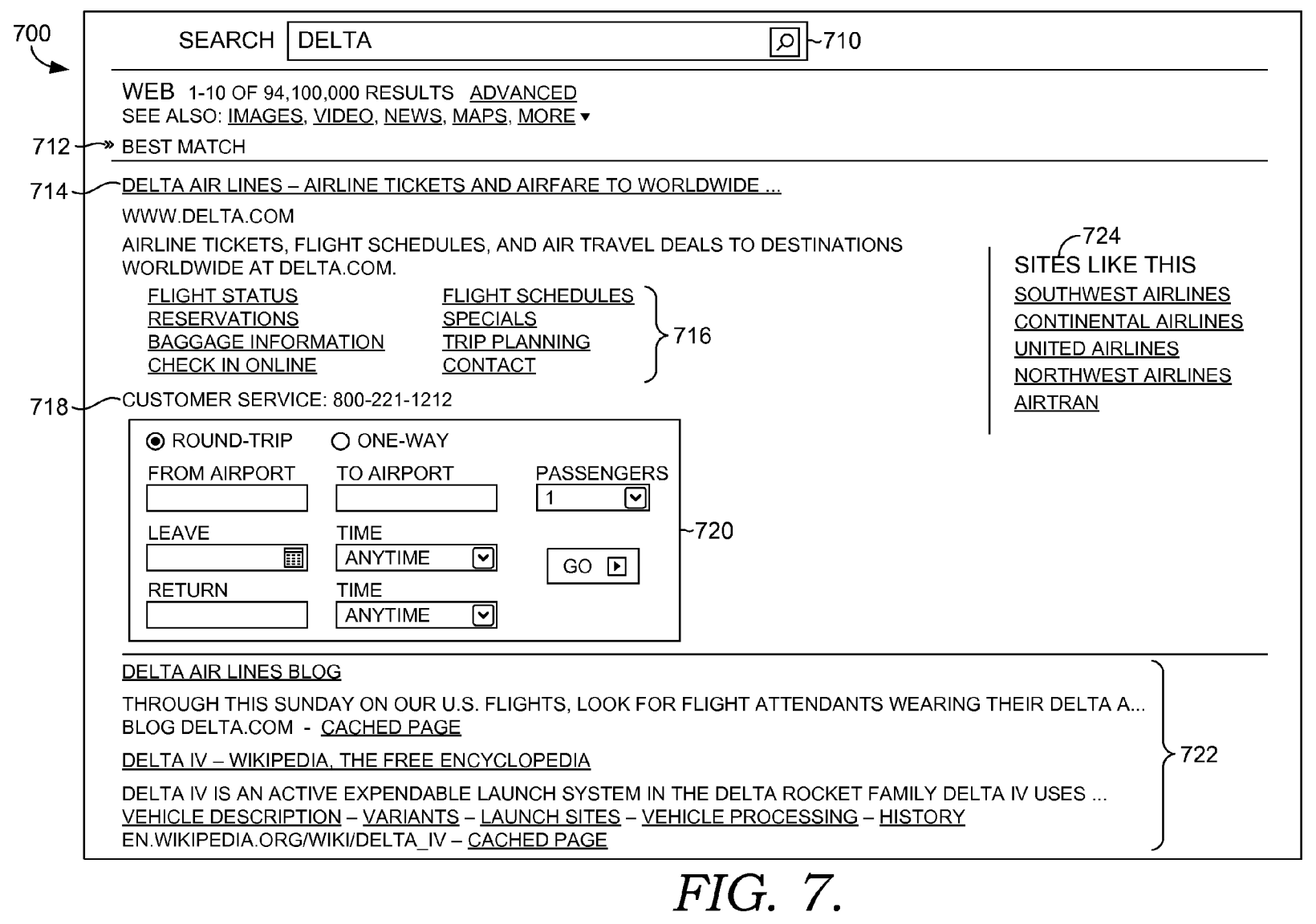

700

SEARCH DELTA 710

WEB 1-10 OF 94,100,000 RESULTS ADVANCED
SEE ALSO: IMAGES, VIDEO, NEWS, MAPS, MORE ▾

712 BEST MATCH

714 DELTA AIR LINES – AIRLINE TICKETS AND AIRFARE TO WORLDWIDE ...
WWW.DELTA.COM
AIRLINE TICKETS, FLIGHT SCHEDULES, AND AIR TRAVEL DEALS TO DESTINATIONS WORLDWIDE AT DELTA.COM.

FLIGHT STATUS
RESERVATIONS
BAGGAGE INFORMATION
CHECK IN ONLINE
FLIGHT SCHEDULES
SPECIALS
TRIP PLANNING
CONTACT
716

718 CUSTOMER SERVICE: 800-221-1212

ROUND-TRIP
ONE-WAY
FROM AIRPORT
TO AIRPORT
PASSENGERS
1
LEAVE
TIME
ANYTIME
GO
RETURN
TIME
ANYTIME
720

724
SITES LIKE THIS
SOUTHWEST AIRLINES
CONTINENTAL AIRLINES
UNITED AIRLINES
NORTHWEST AIRLINES
AIRTRAN

DELTA AIR LINES BLOG
THROUGH THIS SUNDAY ON OUR U.S. FLIGHTS, LOOK FOR FLIGHT ATTENDANTS WEARING THEIR DELTA A...
BLOG DELTA.COM - CACHED PAGE

DELTA IV – WIKIPEDIA, THE FREE ENCYCLOPEDIA
DELTA IV IS AN ACTIVE EXPENDABLE LAUNCH SYSTEM IN THE DELTA ROCKET FAMILY DELTA IV USES ...
VEHICLE DESCRIPTION – VARIANTS – LAUNCH SITES – VEHICLE PROCESSING – HISTORY
EN.WIKIPEDIA.ORG/WIKI/DELTA_IV – CACHED PAGE
722

*FIG. 7.*

PROVIDING TOOLS FOR NAVIGATIONAL SEARCH QUERY RESULTS

BACKGROUND

A user typically must submit more than one query, and may subsequently select more than one provided search result in order to locate desired information, as the user is not provided with a single search result that is most likely to contain the information that he or she is looking for. In many cases, selecting and browsing through each search result may take a good amount of the user's time and effort. For example, once a search result is selected, the user may spend a significant amount of time scrolling through various webpages associated with that search result in order to locate specific information, such as a telephone number for a store or other business, location information, images, videos, news stories, or the like. While providing a user with search results is one portion of completing that user's overall task, which may include locating specific information, the user still has not been provided with the information that he or she desires. For instance, if a user would like to search for flights to a certain destination, the user may enter a general query on a search page, locate the desired airline in one of the search results, select that search result, locate the search area, and enter time, date, and location information. This process may be performed for each airline.

SUMMARY

Embodiments of the present invention relate to methods and computer-readable media for, among other things, identifying a target search result and information associated with the target search result so that it can be displayed for the user on a search results page. Initially, a user may enter a search query on a search page. Once received, a database may be inspected to determine a target search result that has been predetermined to be most relevant to the same or a similar query. Its relevancy may be determined by the query itself, or past user behavior associated with the query and the target search result. In addition to the target search result, relevant information may also be displayed on the search results page, which may include material that can be found on the webpage associated with the target search result, or tools, such as forms, that include input boxes, including, but not limited to, login boxes and search boxes for logging into or searching the webpage associated with the target search result. This allows the functionality of the target search result's webpage to be available to the user on the search results page.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein:

FIG. 7 is an illustrative screen display of a search results page having a target search result and relevant information, in accordance with another embodiment of the present invention;

DETAILED DESCRIPTION

Figure 1:
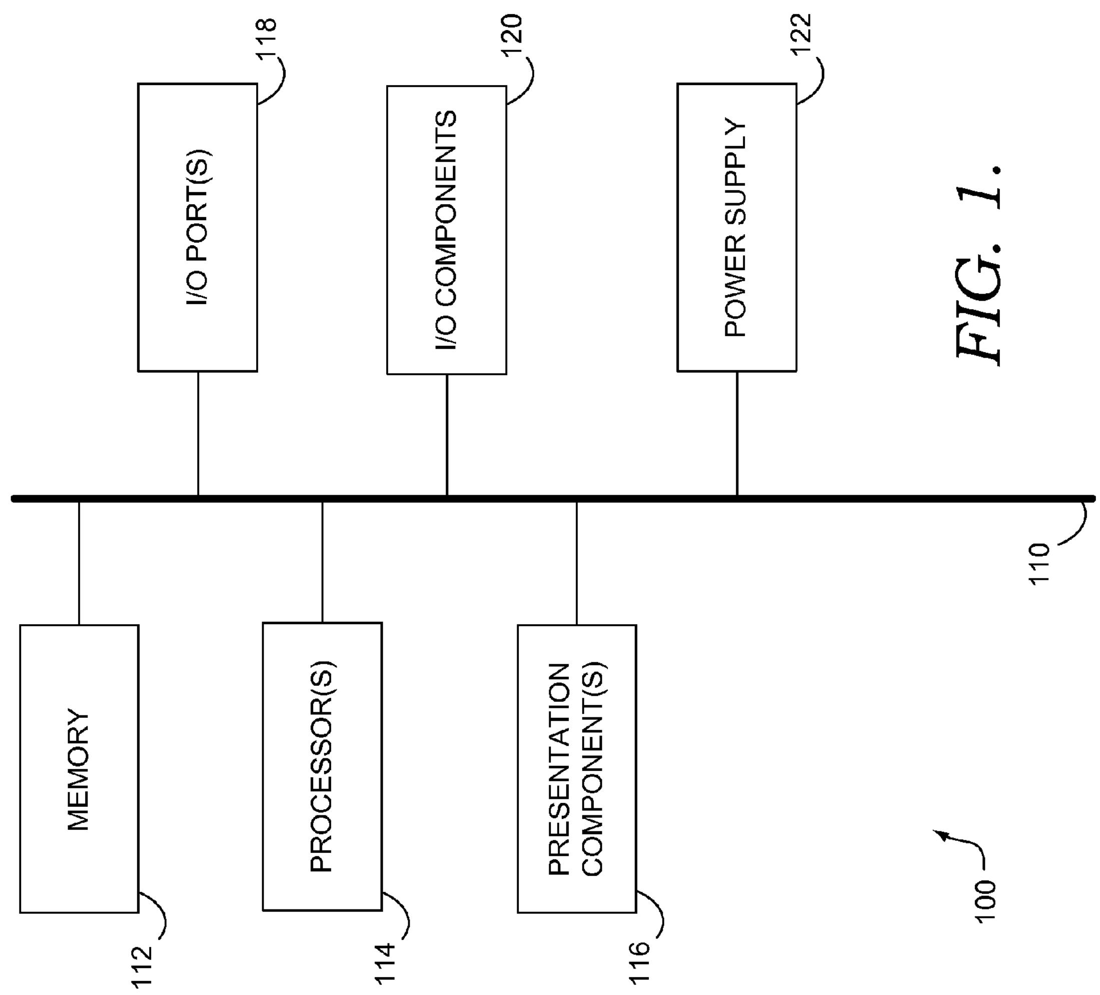
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods and computer-readable media for generating a search results page that includes the most relevant search result associated with the query and information corresponding to that search result. Once a user enters a query on a search page, a database is queried to locate a target search result that best corresponds to the query, in addition to various types of information and tools that allow a user to interact with the target search result's webpage, but from the search results page. Tools may allow a user to, for example, login, search, check on a flight status, locate flights, track packages, etc., all from the search results page. Providing information and tools on the search results page prevents the user from having to select one or more search results links in order to find the correct one, and then scrolling and searching through each webpage to locate desired information or tools.

Accordingly, in one aspect, one or more computer-readable media having computer-executable instructions embodied thereon, that when executed, cause a computing device to perform a method of generating a search results page having search results and relevant information associated with a target search result that is based on a user-inputted query are provided. The media include receiving a query on a search page. Based on the query, a target search result that best corresponds to the query and a functional tool that allows a user to directly interact with the webpage by way of the search results page are identified from a database. The functional tool includes input boxes that allow for the user to provide input. Once the input that has been provided in the one or more input boxes has been submitted, the user is directed to one or more of the search results page that provides the user with responses associated with the input provided in the one or more input boxes, or a response page that is associated with the target search result. Additionally, the media include generating the search results page that includes the target search result and the functional tool.

In another aspect, a computer-implemented method is provided that, when executed by a computing device, generates a search results page having search results and relevant information associated with a target search result that is based on a user-inputted query. The method includes receiving a first query on a search page, and identifying from a database a first target search result that best corresponds to the first query and a first functional tool associated with the first target search result that allows a user to directly interact with a webpage corresponding to the first target search result. The first functional tool includes input boxes that allow for a user to provide input. On a first search results page that includes the first target search result and the first functional tool, the method includes receiving the input from the user into the input boxes. A response page associated with the first target search result is then displayed. Further, the method includes receiving a second query on the search page, and identifying from the database a second target search result that best corresponds to the second query and a second functional tool associated with the second target search result. Additionally, the method includes, on a second search results page that includes the second target search result and the second functional tool, automatically populating the input boxes of the second functional tool with the input that the user previously entered into the first functional tool.

In yet another aspect, one or more computer-readable media having computer-executable instructions embodied thereon, that when executed, cause a computing device to perform a method of generating a search results page having search results and relevant information associated with a target search result that is based on a user-inputted query are provided. The media include receiving a query on a search results page, and identifying from a first database the search results that correspond to the query. Further, the media include identifying from a second database, the target search result that best corresponds to the query, and relevant information associated with the target search result. The relevant information includes targeted material that includes one or more of a phone number, location information, images, videos, coupons, or news stories. Additionally, the relevant information includes functional tools that allow a user to directly interact with the webpage by way of the search results page. The functional tools include input boxes that allow for a user to provide input. Further, the functional tools include one or more of a site search box that searches the webpage associated with the target search result, a login box that allows a user to login to the webpage associated with the target search result, an airline searching tool, or a package tracking tool. The media also include generating the search results page that includes the search results, the target search result, and the relevant information. The target search result is displayed on the search results page in a way that visually distinguishes it from the search results.

Having briefly described an overview of the present invention, an exemplary operating environment in which various aspects of the present invention may be implemented is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including handheld devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventor hereof recognizes that such is the nature of the art and reiterates that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer-storage media and communication media. Computer-storage media include both volatile and nonvolatile, removable and non-removable media implemented in any method or technology for storage of information such as computer-readable instructions, data structures, program modules or other data. Computer-storage media include, but are not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 100.

The memory 112 includes computer-storage media in the form of volatile and/or nonvolatile memory. The memory 112 may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 presents data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components 120 include a microphone, joystick, game pad, satellite dish, scanner, printer, wireless device, and the like.

Figure 2:
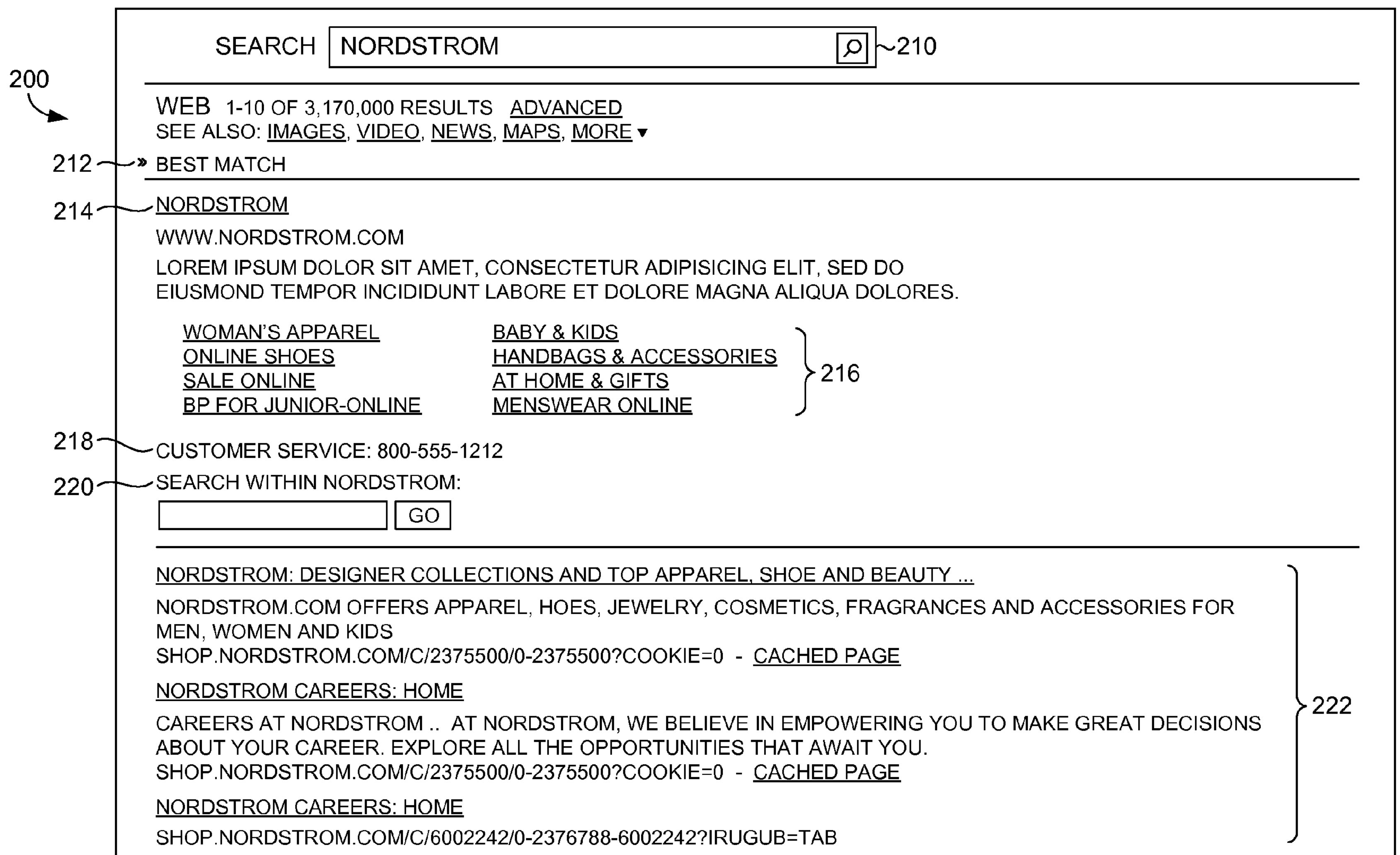
FIG. 2 is an illustrative screen display of a search results page having a target search result and relevant information, in accordance with an embodiment of the present invention.

Referring now to FIG. 2, an illustrative screen display 200 is shown of a search results page having a target search result and relevant information, in accordance with an embodiment of the present invention. Initially, a search box 210 allows for a user to input a query or search term. Here, "Nordstrom" has been entered as the query. In response to the query, a database may be searched to determine a target search result that best matches the query. A best match heading 212 is shown in FIG. 2, along with the target search result 214 that has been determined to be most relevant to the query. There are many ways that the target search result may have been determined to be most relevant to the query. For example, there may be an obvious best match in some cases, such as when the query is the name of a store, brand, etc., such as is the case with the "Nordstrom" query. Here, the Nordstrom webpage is likely to be the best match. In other cases where the best match may not be as obvious, other factors are used to make the determination as to the best match. These factors may include past user behavior, such as, but not limited to, whether users in the past were satisfied with particular search results, whether the query is a celebrity or product query, how users have interacted with returned search results, whether a particular search result is the last result visited or whether they visit other returned search results, how long users stay on a particular webpage associated with a search result, or whether the user selects a search result or enters a different query to limit results. Any of these factors or any others may be used to determine a target search result for a given query.

In one embodiment, more than one target search result is returned to the user in association with a particular query. Further, while "best match" has been used for the heading 212, other terms may also be used in other embodiments, such as "best bet" or the like. Additionally, the appearance or display of the target search result may be such that it is easily identifiable on the search results page. For example, as shown in FIG. 2, lines may appear above and beneath the target search results and its associated information, which draws a user's attention to that portion of the search results page. Other embodiments may include highlighting, different coloring, borders, etc., which draw a user's focus to that portion of the search results page.

A plurality of subject matters 216 that are related to the target search result are illustrated, and include, for example, women's apparel, online shoes, sale online, baby & kids, handbags & accessories, at home & gifts, and menswear online. These allow a user to quickly locate various types of information on the webpage corresponding to the target search result 214. Further, related information is illustrated at 218 and 220. At 218, targeted material is displayed, which in the embodiment of FIG. 2, includes a customer service phone number. Generally, targeted material is any information or material that can be accessed on the webpage associated with the target search result, but is stored in a database and displayed, along with the target search result, on the search results page. This allows the user to access this information without the need for selecting a search result and subsequently looking for that information on the webpage. The type of targeted material that is displayed on the search results page may vary depending on the query, the target search result, etc.

Targeted material may include, but is not limited to, phone numbers, local store information (e.g., locations, addresses), images, videos, news from or about the target search result, recent blog entries, coupons, news stories (e.g., RSS feed), or the like. Phone numbers may include customer service phone numbers or phone numbers of specific store locations, for example. In one instance, a webpage associated with the target search result contains images or videos. These may be displayed on the search results page. In another instance, when coupons, news stories, or other targeted material that may frequently change are to be displayed on a search results page, the database may be updated more frequently than other times. Normally, the database may be updated on a daily, weekly, or monthly basis, but may be updated on a more frequent basis, such as every minute, five minutes, etc., if the targeted information is time sensitive, such as news stories and the like. It is important to note that the targeted material can be found directly on the webpage associated with the target search result. It is extracted from this webpage before being stored on a database, and is not extracted from some other source, such as white pages, directory service, or other webpages.

Beneath the targeted material 218 in FIG. 2 is a functional tool 220. In the embodiment of FIG. 2, the functional tool takes the form of a search box that allows a user to search within the webpage associated with the target search result, as opposed to a search of the search engine's database (e.g., search box 210). Functional tools are generally tools that allow a user to interact directly with the target search result's webpage and typically contain one or more input boxes (e.g., input boxes). Functional tools may allow a user to, for example, search for various items, login (e.g., login to the target search result's webpage), check flight status information, search for flight times, etc. More specifically, in one embodiment, a user can enter a query and search the webpage associated with the target search result but search from the search results page and not from the webpage associated with the target search result. In another embodiment, a user can enter a package or tracking number into a search box on the search results page and be directed to the webpage that displays the tracking information for that particular package. In yet another embodiment, as mentioned above, a user may search for flight status information, such as by entering a flight number and being directed to a webpage associated with the target search result that provides the user with information regarding the status of that particular flight. Other instances of functional tools are contemplated to be within the scope of the present invention. Further, the targeted material and functional tools may be located anywhere on the search results page and are not limited in location to beneath the target search result.

Another portion of the search results page may include various other search results 222 and, in one embodiment, may exclude the target search result. These search results may be displayed in one embodiment, such as the embodiment of FIG. 2, but may not be displayed in another embodiment, as will be illustrated in various other embodiments of the present invention. These search results may be related to the user's query, but may not have been determined to be as relevant to the query as the target search result.

Figure 3:
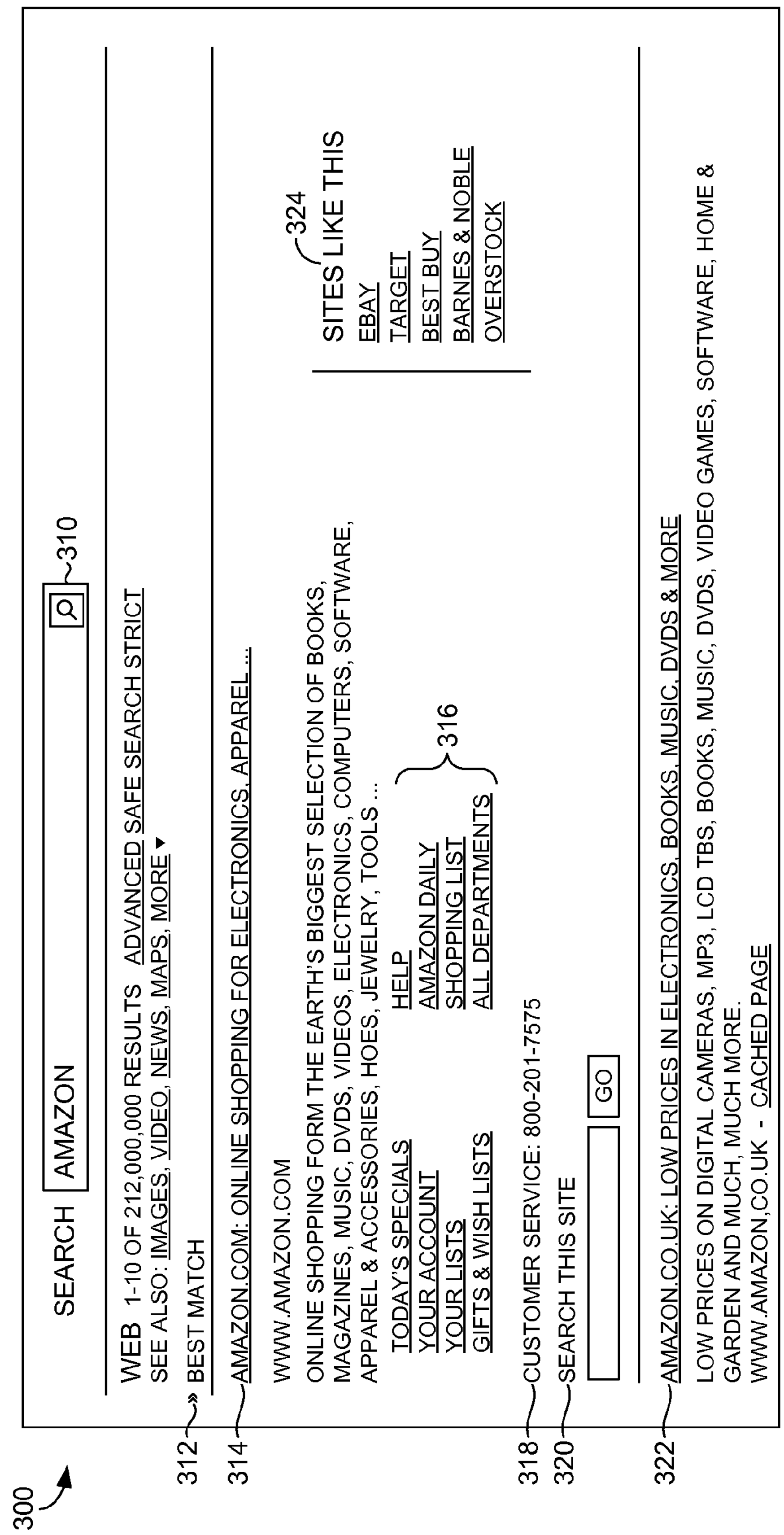
FIG. 3 is an illustrative screen display of a search results page having a target search result and relevant information, in accordance with another embodiment of the present invention.

Turning now to FIG. 3, an illustrative screen display 300 is shown of a search results page having a target search result and relevant information, in accordance with an embodiment of the present invention. Initially, a search box 310 allows a user to enter a search query. Here, the query entered by a user is "amazon." A best match 312 is displayed illustrating the target search result 314 found from querying a database containing a plurality of queries and search results, such as target search results. In addition to the target search result is a plurality of related subject matters 316 that are listed to assist the user in narrowing his or her search. At 318 and 320, related information is shown. Targeted information 318 illustrates a customer service phone number, which has been taken directly from the target search result and saved to a database for future retrieval. In this instance it has been previously determined that a customer service number is what many users are searching for when entering the query "amazon," and therefore it is subsequently presented to users who enter the same query.

In addition to the targeted information 318, a functional tool 320 is also illustrated in the embodiment of FIG. 3. Here, a site search box is shown, which allows a user to search for a specific query on the webpage associated with the target search result, as opposed to a search using the search engine, as is done when a user enters a query into the search box 310. This allows the user to directly interact with the target search result's webpage without first selecting the target search result, finding the search box, etc. This brings the functionality of the target search result's webpage to the search results page. A search result is shown at 322. This search result may not have been determined to be as relevant to the query as the target search result, and is thus illustrated in a different portion of the search results page than the target search result.

Additionally, a portion of the search results page may include various links to websites 324 similar to that of the target search result. For example, a user searching for an item on Amazon may be able to find the same or a similar item at other online stores, such as those illustrated at 324. In one embodiment, if a user has searched for a particular item on the target search result's webpage, or has entered a search term in a functional tool, such as 320, that particular item may be cached and used to automatically populate a similar search box when the user visits one of the similar webpages, such as those listed at 324. This prevents the user from entering the same information several times, and allows for a quick search of various websites to find a particular item.

Figure 4:
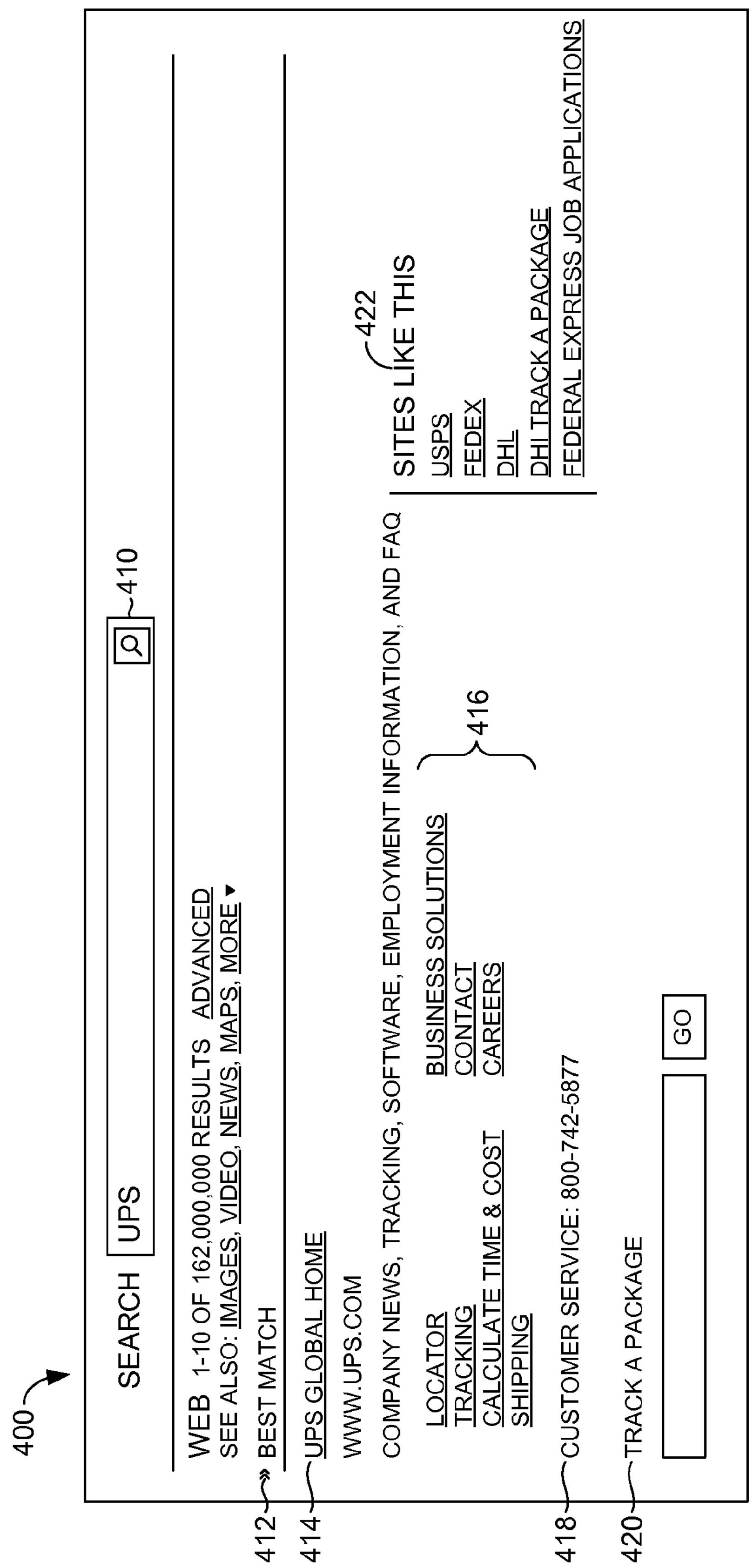
FIG. 4 is an illustrative screen display of a search results page having a target search result and relevant information, in accordance with another embodiment of the present invention.

Referring to FIG. 4, an illustrative screen display 400 is shown of a search results page having a target search result and relevant information, in accordance with an embodiment of the present invention. Initially, a search box 410 is illustrated that allows a user to enter a query, here "UPS," and that provides for a search for the query using the search engine. A database is inspected to determine a best match 412 or a target search result for that exact query or a query that is most similar to that query. Once located in the database, the target search result is returned, along with any relevant information that is found in the database. The target search result 414 is displayed on the search results page. Other information associated with the target search result includes the subject matters 416, which allow a user to select a link and locate specific information on the webpage without first entering the webpage associated with the target search result.

Relevant information is illustrated at 418 and 420. Item 418 is targeted information, and in the embodiment of FIG. 4, is a customer service phone number. Other types of targeted material may include, but are not limited to, phone numbers, local store information (e.g., locations, addresses), images, videos, news from or about the target search result, recent blog entries, coupons, news stories (e.g., RSS feed), or the like. Item 420 is a functional tool. In the embodiment of FIG. 4, the functional tool allows for a user to track a package from the search results page. This functionality is extracted from the target search result's webpage, and is now on the search results page, which prevents the user from having to select the target search result, find the search box to track a package, and then enter the tracking or package number. Functional tools may allow a user to, for example, search for various items, login (e.g., login to the target search result's webpage), check flight status information, search for flight times, etc. Tracking a package is just one example of a functional tool.

As described in FIG. 3, similar websites 422 to the target search result may be displayed on the search results page, allowing for a user to easily search for a particular item or service on similar sites. For example, in the embodiment of FIG. 4, since the user is searching for UPS, the user may be provided with results that provide similar services (e.g., shipping, mailing) or products (e.g., shipping boxes). In one embodiment, if a user has searched for a particular item on the target search result's webpage, or has entered a search term, such as a tracking number, in a functional tool, such as 420, that particular query may be cached and used to automatically populate a similar search box when the user visits one of the similar webpages, such as those listed at 422. This prevents the user from entering the same information several times, and allows for a quick search of various websites to find a particular item, such as tracking a package.

Figure 5:
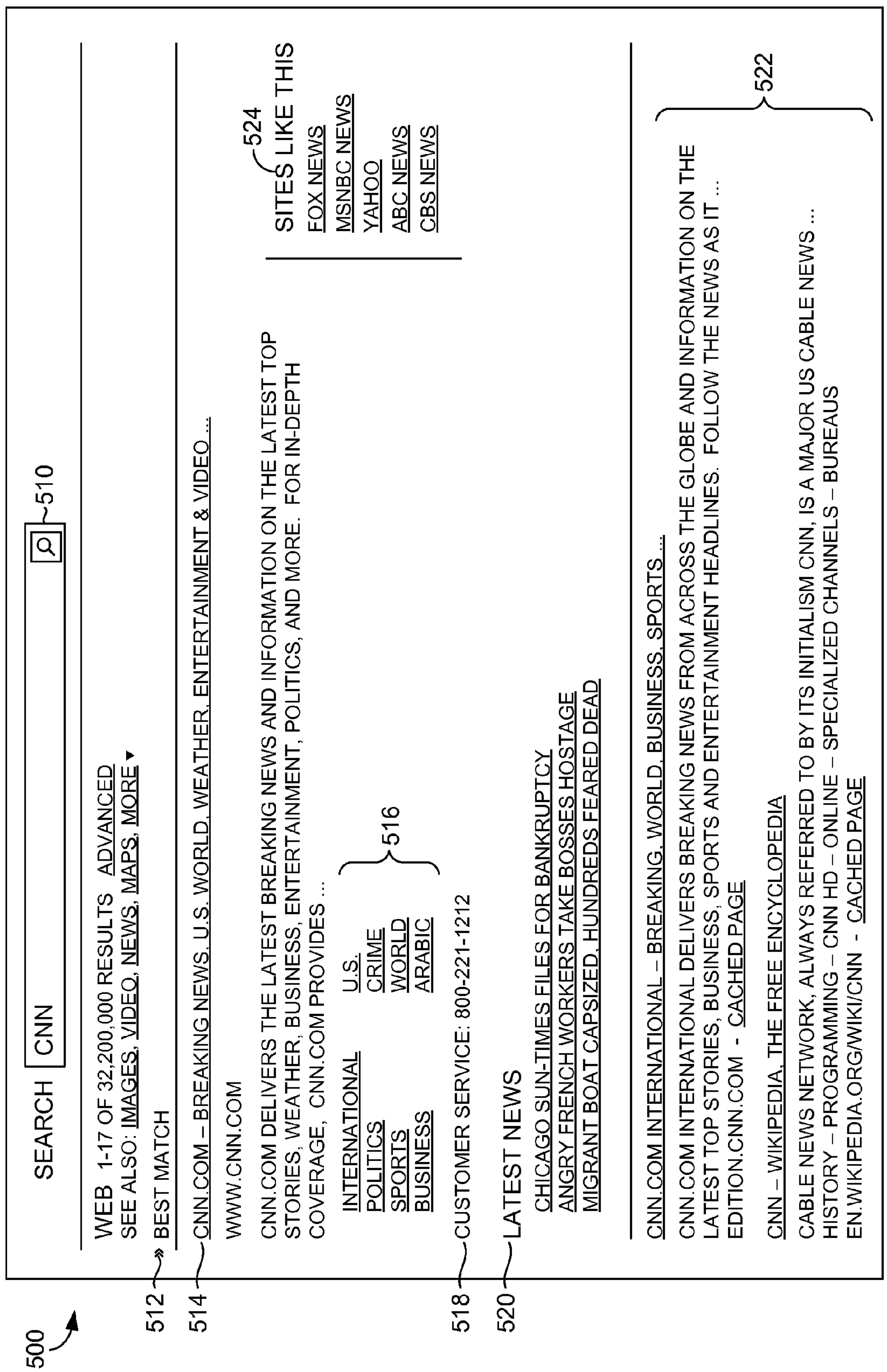
FIG. 5 is an illustrative screen display of a search results page having a target search result and relevant information, in accordance with another embodiment of the present invention.

FIG. 5 is an illustrative screen display 500 of a search results page having a target search result and relevant information, in accordance with an embodiment of the present invention. A search box 510 is shown having a query that has been entered by a user. Here, the query is "CNN." Once entered, a database is searched to determine a target search result that is most relevant to the query. As described above, many factors may be taken into consideration when the determination is made of the target search result. These factors may include past user behavior, such as, but not limited to, whether users in the past were satisfied with particular search results, whether the query is a celebrity or product query, how users have interacted with returned search results, whether a particular search result is the last result visited or whether they visit other returned search results, how long users stay on a particular webpage associated with a search result, or whether the user selects a search result or enters a different query to limit results. Any of these factors or any others may be used to determine a target search result 514 for a given query, which may be displayed near a best match 512 heading. Relevant subject matters 516 are listed below the target search result.

Relevant information is shown at 518 and 520. Here, both 518 and 520 are targeted material that can be found on the target search result's website, but are provided on the search results page. Here, the targeted material includes a customer service number associated with the target search result, and news stories, which also can be found on the target search result's website, but are provided on the search results page so that a user does not have to select the target search result and spend time finding that information. In one embodiment, news stories such as these are RSS feeds, such that the current news stories may change on a relatively short basis (e.g., every minute, every five minutes). Therefore, in these instances, the database that stores these news stories may be updated frequently, such as every two, five, or ten minutes, for example.

Search results 522 are displayed on the search results page. In one embodiment, these search results 522 do not include the target search result, which is displayed on another portion of the search results page. Further, the target search result may be displayed such that it is visually distinguished from the other search results. As shown in FIG. 5, there is a title of best match 512 above the target search result, in addition to a line above and beneath the target search result and its associated information, such as the relevant information 518 and 520. Other embodiments for visually distinguishing the target search result may include highlighting, different coloring, borders, etc., which draw a user's focus to that portion of the search results page. Additionally, similar websites 524 are displayed on the search results page. In the embodiment of FIG. 5, as the query returned a news website, the similar websites are also news websites.

Figure 6:
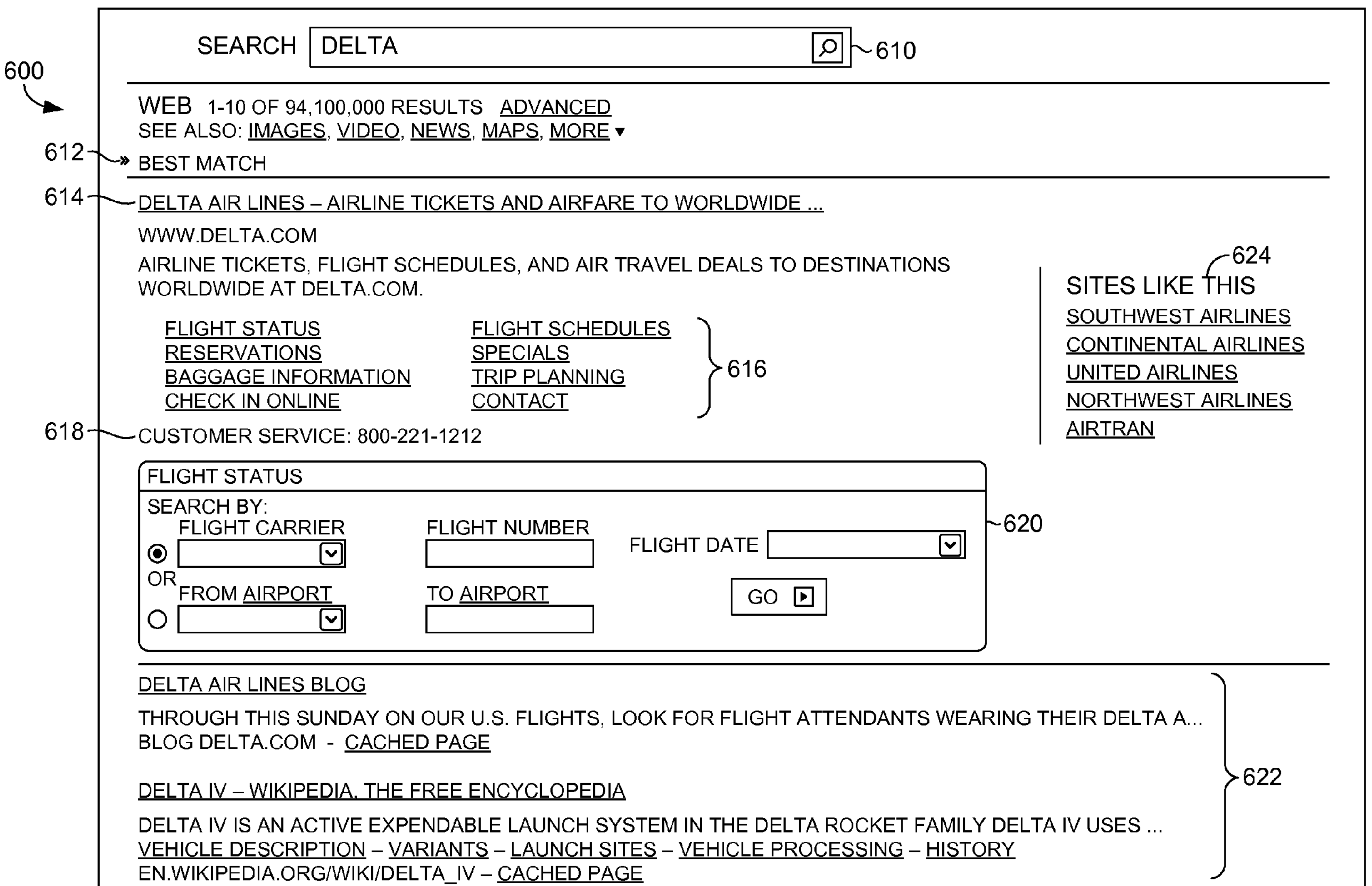
FIG. 6 is an illustrative screen display of a search results page having a target search result and relevant information, in accordance with another embodiment of the present invention.

Referring to FIG. 6, an illustrative screen display 600 is shown of a search results page having a target search result and relevant information, in accordance with another embodiment of the present invention. Initially, a search box 610 is shown with a query that has been inputted by a user. Once entered, a search may be done for the query in a database that contains a plurality of queries and target search results. The database may also contain relevant information associated with the target search results. The best match 612 indicates that a target search result 614 has been found for the query entered in search box 610. The target search result 614 may include relevant subject matters 616 that direct a user toward a particular topic, allowing for the user to select one of the links.

Additionally, various types of relevant information, 618 and 620, are displayed on the search results page. Here, targeted material 618 includes a customer service phone number that has been extracted from the target search result's website, saved to a database, and has been retrieved in association with the entered query. Targeted material, generally, is information or other material that has been determined to be relevant to a particular query. Its relevancy may be determined, for example, by past user behavior, as discussed further herein. Other types of targeted material may include, but are not limited to, phone numbers, local store information (e.g., locations, addresses), images, videos, news from or about the target search result, recent blog entries, coupons, news stories (e.g., RSS feed), or the like.

Functional tool 620 is an example of displaying one or more input boxes on the search results page that allow a user to directly interact with the functionality of the target search result's website, but from the search results page. Here, a user may search for flight status information by entering information in one or more of the provided input boxes. In one embodiment, one or more of the input boxes include a drop-down list of items to select from. Other embodiments include input boxes that require a user to input text, such as a flight number or airport identifiers, as shown in FIG. 6. While this functionality may be available from the target search result's webpage, FIG. 6 illustrates that this functionality is now available on the search results page, such that the user is not required to select a link associated with the target search result's webpage and locate this functionality.

Search results 622 are displayed on the search results page. In one embodiment, these search results 622 do not include the target search result, which is displayed on another portion of the search results page. Additionally, similar websites 624 are displayed on the search results page. In the embodiment of FIG. 6, as the query returned an airline website, the similar websites are also airline websites.

FIG. 7 is an illustrative screen display 700 of a search results page having a target search result and relevant information, in accordance with another embodiment of the present invention. A search box 710 is illustrated, allowing a user to enter a query. Once entered, a database may be searched to locate the query or a similar query that was entered by the user. In addition to containing a plurality of queries, the database may also contain one or more target search results and related information, such as targeted material and functional tools. Beneath the best match 712 heading is the target search result 714, including several related subject matters 716 that can be selected by a user to quickly locate certain information associated with the target search result. The target search result, in one embodiment, has been previously determined to be the most relevant search result in relation to the query entered by the user. This determination may be made using a number of factors, including previous users' behavior, as described above.

Relevant information is shown as 718 and 720. Targeted material 718, in FIG. 7, is a customer service phone number. Other embodiments may include other types of targeted material, such as other phone numbers, local store information (e.g., locations, addresses), images, videos, news from or about the target search result, recent blog entries, coupons, news stories (e.g., RSS feed), or the like. Functional tool 720 includes several input boxes that allow a user to enter time and location information to search for a flight. While this functionality may be available on the target search result's website, it is displayed on the search results page to limit the amount of selections a user has to make to reach this functional tool. Other functional tools may include, for example, login boxes, site search boxes, package tracking searches, etc.

In one embodiment, if a user has entered information into input boxes contained within a particular functional tool, that information may be saved or cached into a cookie or database, for example, and the next time the user is presented with a functional tool containing the same or similar input boxes, that information may be automatically populated into the text boxes so that the user does not have to reenter the information. Additionally, FIG. 7 includes several search results 722 that have been determined to be relevant to the query, but may not have been determined to be as relevant as the target search result, for example. Several similar websites 724 are displayed underneath the heading "sites like this" and allow a user to quickly locate websites that may contain the same products or services offered by the target search result's website. These similar websites 724 may be particularly useful to a user in embodiments such as FIG. 7, where a user enters information into one or more input boxes for one airline company, and then selects a similar website and wishes to enter the same information into the input boxes. As noted above, this information may be automatically populated into the text boxes such that the user is prevented from having to enter the same information multiple times when searching on different airline carriers.

Figure 8:
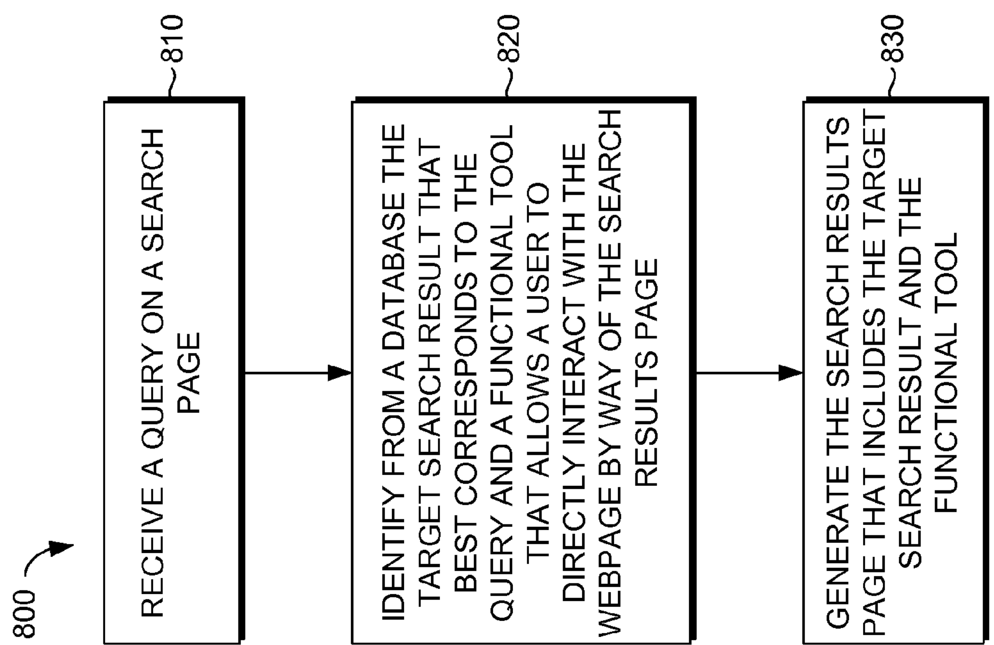
FIG. 8 is a flow diagram of a method for generating a search results page having search results and a functional tool associated with a target search result, in accordance with an embodiment of the present invention.

Referring now to FIG. 8, a flow diagram of a method 800 is illustrated for generating a search results page having search results and a functional tool associated with a target search result, in accordance with an embodiment of the present invention. Initially, a query is received on a search page, shown at step 810. The query may have been entered by a user, for example, on a general search page. Once received, a target search result is identified from a database at step 820. The target search result identified best corresponds to the query entered by the user. Also identified from the database is a functional tool that allows a user to directly interact with the webpage by way of the search results page.

The target search result may have been predetermined to best correspond (i.e., most relevant search result) to the query. This determination may be made by a number of factors, such as the query itself, or past user behavior. For example, many queries are simple, such as one or two words, and may refer to a particular store. In that case, the target search result may be the store's website. Past user behavior may include, for example, whether users in the past were satisfied with particular search results, whether the query is a celebrity or product query, how users have interacted with returned search results, whether a particular search result is the last result visited or whether they visit other returned search results, how long users stay on a particular webpage associated with a search result, or whether the user selects a search result or enters a different query to limit results. Any of these factors or any others may be used to determine a target search result for a given query.

In one embodiment, statistics associated with the target search result are also displayed on the search results page, indicating to the user whether other users found that target search result useful or not. This provides the user with feedback accumulated from other users as to whether that target search result assisted in answering the users' queries that returned that particular search result. Additionally, page views over time may also be displayed on the search results page in association with the target search result, which is one form of statistics, that allow the user to better predict how authoritative the target search result is in relation to the query.

In addition to identifying the target search result, relevant information associated with the target search result may also be identified from the database. For example, functional tools allow a user to directly interact with the webpage by way of the search results page. Functional tools also typically contain one or more input boxes that allow for the user to provide input. Examples are illustrated in FIGS. 2, 3, 4, 6, and 7. Functional tools allow the certain functionality available on the webpage associated with the target search result to be available on the search results page, such as the pages shown in previously discussed figures. While search results pages may include a search box for the user to input another or a different query than what was previously entered, this search does not allow the user to search only the webpage associated with the target search result. Allowing the user to search only the webpage associated with the target search result from the search results page provides many advantages over the user first selecting the target search result, then locating the search box on the webpage. This saves time and effort on the user's part.

Once information is entered into the input boxes, the user is directed to the same search results page, which may now provide the user with responses associated with the input provided in the one or more input boxes, or a response page that is associated with the target search result. Whether the same search results page or a response page associated with the target search result is displayed, either may provide the user with a response or answer to the user's inputted information into the input boxes. Alternatively, the user may be directed to a second search results page, such as one that does not contain the original information displayed on the search results page, such as the same search results, the target search result, the relevant information (e.g., functional tools and targeted material), etc. In this respect, a second search results page differs from the original search results page.

Examples of functional tools include, but are certainly not limited to, a site search box that searches the webpage associated with the target search result, a login box that allows a user to login to the webpage associated with the target search result, an airline searching tool, or a package tracking tool. Once the target search result and functional tool are identified, the search results page is generated at step 830, and includes the target search result and the functional tool.

While one embodiment includes displaying on a search results page only the target search result and relevant information (e.g., functional tools), another embodiment displays, in addition to the target search results and relevant information, other search results, such as is typically displayed on a search results page. These other search results may be determined by searching a database and then may be displayed on the search results page. The target search result may be displayed in a way that visually distinguishes it from the other search results, which may include lines above and beneath the target search result, highlighting it, surrounding it by a border, or the like. In one embodiment, the search results stored in the database may be tagged according to whether each search result is an official webpage. For example, if a search result is the webpage corresponding to a certain store or business, that webpage may be tagged as official. An indication may be provided near the search result on the search results page so that the user is aware whether the search result is the official website or not.

Further, other types of relevant information may also be determined from a database and displayed on the search results page, including targeted material that has been determined to be relevant to the webpage associated with the target search result. Targeted material displayed on the search results page allows the user to access relevant information without the need for selecting a search result and subsequently looking for that information on the webpage. The type of targeted material that is displayed on the search results page may vary depending on the query, the target search result, etc.

Targeted material may include, but is not limited to, phone numbers, local store information (e.g., locations, addresses), images, videos, news from or about the target search result, recent blog entries, coupons, news stories (e.g., RSS feed), or the like. Phone numbers may include customer service phone numbers or phone numbers of specific store locations, for example. In one instance, a webpage associated with the target search result contains images or videos. These may be displayed on the search results page. In another instance, when coupons, news stories, or other targeted material that may frequently change are to be displayed on a search results page, the database may be updated more frequently than other times. Normally, the database may be updated on a daily, weekly, or monthly basis, but may be updated on a more frequent basis, such as every minute, five minutes, etc., if the targeted information is time sensitive, such as news stories and the like. It is important to note that the targeted material can be found directly on the webpage associated with the target search result. It is extracted from this webpage before being stored on a database and is not extracted from some other source, such as a white pages, directory service, or other webpages.

Figure 9:
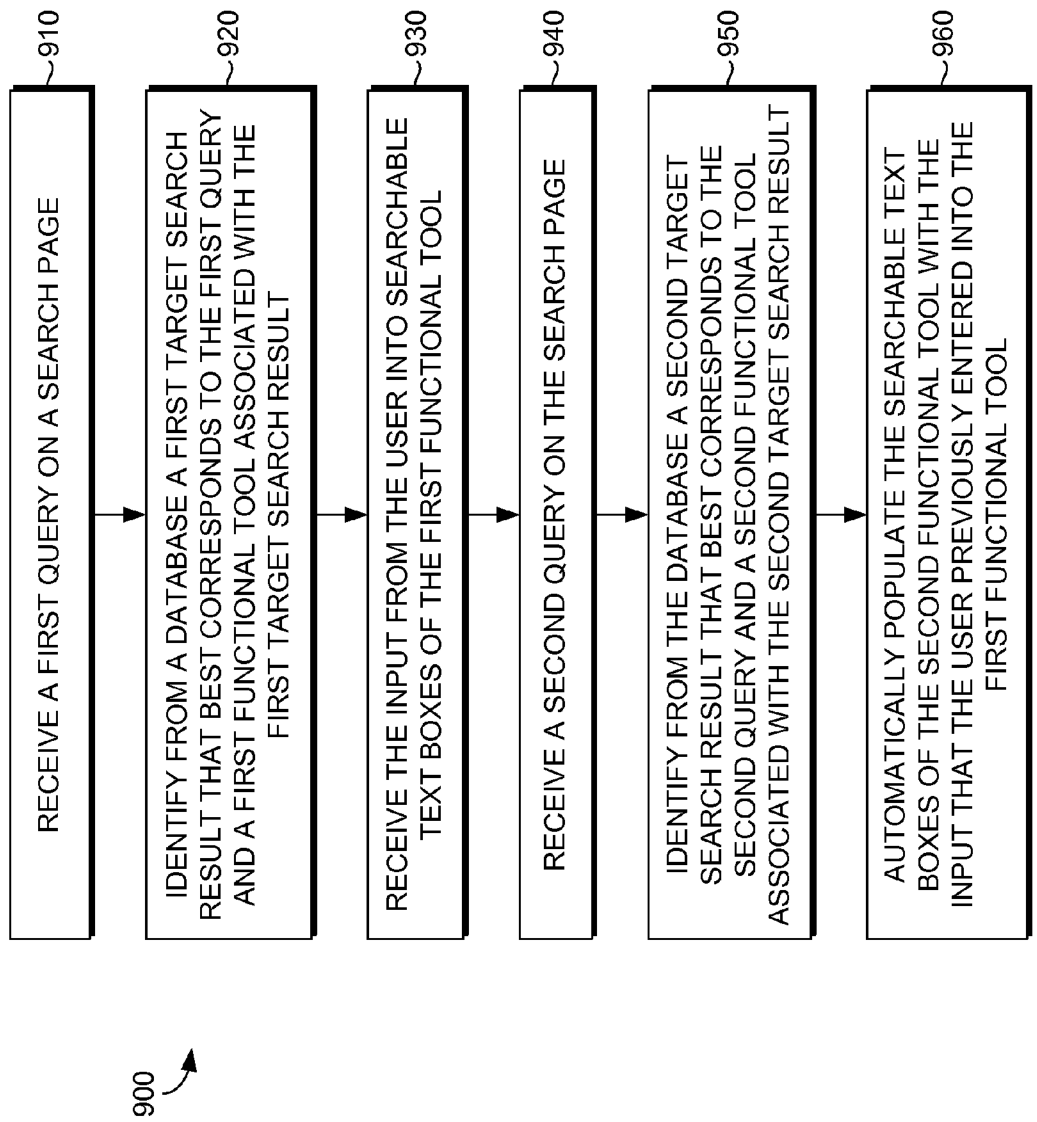
FIG. 9 is a flow diagram of a method for automatically populating a second functional tool with information entered by a user in a first functional tool, in accordance with an embodiment of the present invention.

FIG. 9 is a flow diagram of a method 900 for automatically populating a second functional tool with information entered by a user in a first functional tool, in accordance with an embodiment of the present invention. At step 910, a first query is received on a search page provided by a particular search engine. A database is then accessed to identify, at step 920, a first target search result that best corresponds to the first query. Also identified is a first functional tool associated with the first target search result. As described above, the determination of the target search result and functional tool that are to be displayed on the search results page is done by considering one or more of many factors, which may include the query itself, previous user behavior, etc. The first functional tool includes one or more input boxes that allow for a user to provide input.

At step 930, input is received from the user into the input boxes of the first functional tool. This may include flight information, search queries for searching the target search result's webpage, tracking information for a package, flight status information, etc. Once the user has entered information or text into the input boxes, a results page will be displayed that provides the user with further information that answers their question or provides them with results. This results page is associated with the target search result. The user may now choose to select a different website, such as a similar website as described above that may be displayed on the search results page. For example, if the user was originally searching for Delta Airlines, the user may have entered in search criteria to locate flights but may now want to find flights offered by another airline.

As such, a second query may now be received on a search page, shown at step 940. Alternatively, the user may select a similar website listed on the search results page. At step 950, a second target search result that best corresponds to the second query is identified from the database. Additionally, a second functional tool associated with the second target search result is also identified from the database. In one embodiment, the second functional tool requests the same or similar input as the first functional tool. For example, if the first functional tool required input relating to flight information, such as a user's date and time preferences, the second functional tool may also require this same information.

At step 960, the input boxes of the second functional tool are automatically populated with the input that the user previously entered into the first functional tool, such that the user is not required to enter the same information multiple times. The user may then hit the submit button, for example, and will be taken to a response page associated with the second target search result. Alternatively, the user may be directed to the same search results page, where the answers to the user's input or query may appear. For example, if a user has entered flight information in input boxes and is searching for a flight status, a flight status box may appear on the search results page, and once the user selects a submit button, for example, the flight status information may appear in the flight status box on the same search results page. Or, the user may be directed to a different, or a second search results page that contains answers to the user's input.

In one embodiment, the information entered into the first functional tool is stored into a user cookie, and the next time that information is needed to populate input boxes associated with a second functional tool, that information is retrieved from the cookie. In another embodiment, the information is stored in a database, such as on the server side, and when that information is needed, a search of the database is performed, and if the information is located, it is retrieved and used to populate the input boxes associated with the second functional tool. In either case, the user may be identified in one of many ways, such as a client ID, which is tied to the user cookie. Further, while a single database has been described, different searches for different types of information (e.g., first functional tool, second functional tool, first target search result, second target search result, other search results), more than one database may be used to store and retrieve this information.

Figure 10:
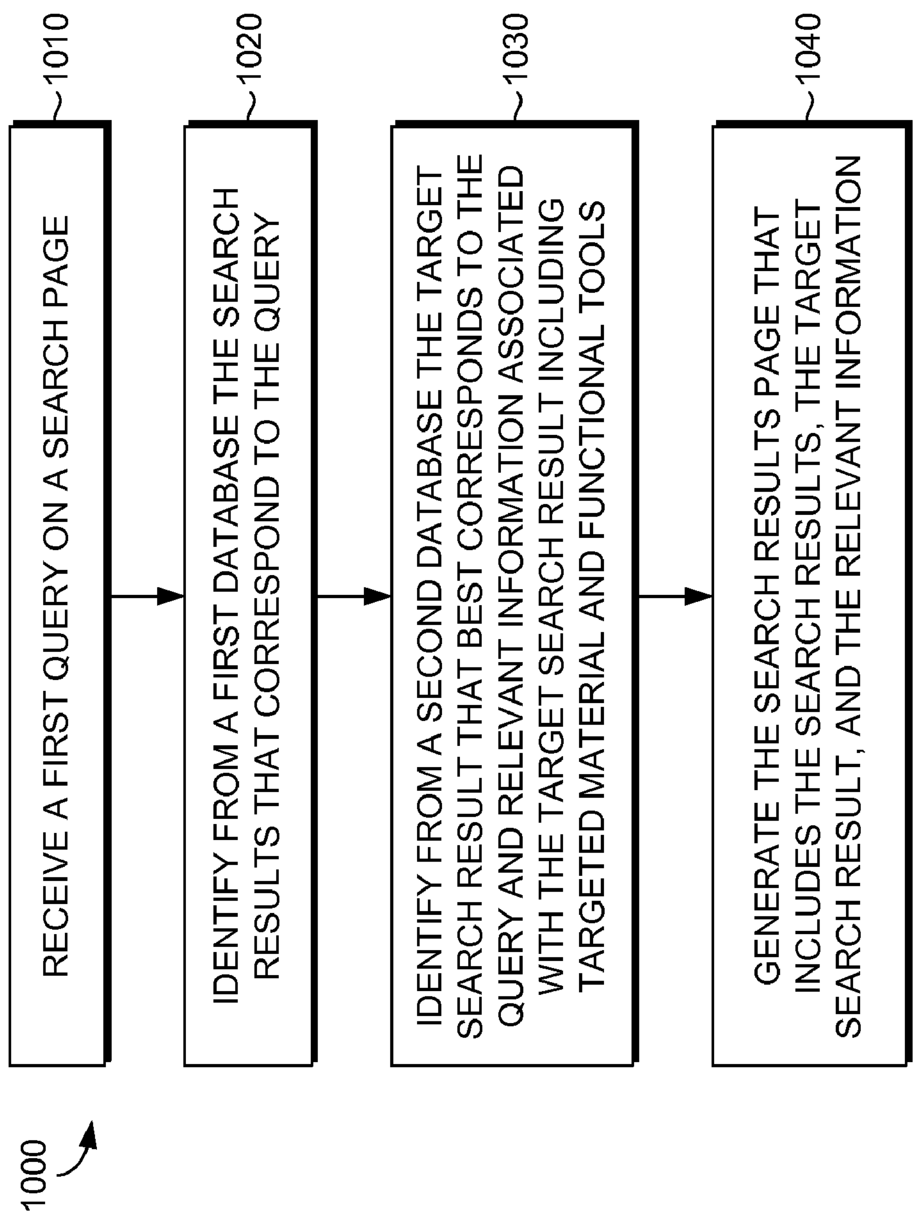
FIG. 10 is a flow diagram of a method for generating a search results page having search results and relevant information associated with a target search result, in accordance with an embodiment of the present invention.

Turning to FIG. 10, a flow diagram is illustrated of a method 1000 for generating a search results page having search results and relevant information associated with a target search result, in accordance with an embodiment of the present invention. At step 1010, a first query is received on a search page. One or more search results corresponding to the query are then identified from a database at step 1020. At step 1030, a target search result that best corresponds to the query is identified from a second database. Also identified from the second database is relevant information associated with the target search result. Relevant information may include targeted material and functional tools. The target search result and relevant information may be determined to best correspond to the query by considering a number of factors, including the query itself and past user behavior in association with that query, as further described herein.

Targeted material is information or material that can be accessed on a webpage associated with the target search result but is displayed or provided on the search results page. This information is extracted from the target search result's webpage, saved to a database, and retrieved when the target search result is to be displayed on the search results page. Targeted material includes one or more of a phone number, location information, images, videos, coupons, or news stories.

Functional tools allow a user to directly interact with the webpage by way of a search results page, and may include one or more input boxes that allow for a user to provide input. Examples of functional tools include a site search box that searches the webpage associated with the target search result, a login box that allows a user to login to the webpage associated with the target search result, an airline searching tool, or a package tracking tool. These are just a few examples, and others are contemplated to be within the scope of the present invention. This functionality may be available when a user is actually on the webpage associated with the target search result, but, here, it is available on the search results page.

At step 1040, the search results page is generated, and includes the search results, the target search result, and the relevant information, including the targeted material and the functional tools. In one embodiment, the target search result may be displayed on the search results page in a way that visually distinguishes it from the one or more other search results, such that is draws the user's attention. This may be done by including a line above and below the target search result and the relevant information, as shown in FIGS. 2-7, by using a border, or by highlighting the target search result. Further, while multiple databases have been described in the embodiment of FIG. 10, there may be just one database. For example, the first and second database may be the same database.

In one embodiment, one or more related webpages are identified from a third database. These related webpages may be similar to the target search result (e.g., sell the same products or services). Once identified, these related webpages may be displayed on the search results page.

The foregoing descriptions of embodiments of the invention are illustrative, and modifications in configuration and implementation will occur to persons skilled in the art. For instance, while the present invention has generally been described with relation to FIGS. 1-10, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

What is claimed is:

1. One or more computer-storage media excluding a signal having computer-executable instructions embodied thereon, that when executed, cause a computing device to perform a method of generating a search results page having one or more search results and relevant information associated with a target search result that is based on a user-inputted query, the method comprising:

receiving a query in a search box on a search page;

based on the query, identifying from a database the target search result that best corresponds to the query and a functional tool corresponding to the target search result that allows a user to directly interact with a webpage associated with the target search result by way of the search results page without the user selecting the target search result, wherein the functional tool and the search box are simultaneously displayed on the search results page, wherein the functional tool includes one or more input boxes that allow for the user to provide input, and wherein once the input that has been provided into the one or more input boxes has been submitted, the user is directed to one or more of, (1) the search results page that has been modified to include responses associated with the input provided into the one or more input boxes, or (2) a response page that is associated with the target search result; and generating the search results page that includes the target search result and the functional tool.

2. The media of claim 1, wherein the functional tool includes one or more of a site search box that searches the webpage associated with the target search result, a login box that allows a user to login to the webpage associated with the target search result, an airline searching tool, or a package tracking tool.

3. The media of claim 1, further comprising:

determining the one or more search results that have been determined to be relevant to the query; and displaying the one or more search results on the search results page.

4. The media of claim 1, further comprising:

identifying from the database targeted material; and displaying the targeted material on the search results page.

5. The media of claim 4, wherein the targeted material is retrieved from the webpage corresponding to the target result page and stored in the database.

6. The media of claim 5, wherein the targeted material includes one or more of a phone number, location information, images, videos, coupons, or news stories.

7. The media of claim 1, further comprising:

receiving input from a user into the one or more input boxes; and displaying a response page that is associated with the target search result.

8. The media of claim 1, wherein the target search result is determined to best correspond to the query based on past user behavior in association with the query and the target search result.

9. The media of claim 3, wherein the target search result is displayed on the search results page in a way that visually distinguishes it from the one or more search results.

10. The media of claim 1, wherein the database includes a plurality of queries and associated search results, and wherein the search results are tagged according to whether each of the search results is an official webpage.

11. The media of claim 1, wherein in addition to the target search result and the functional tool, target search results statistics associated with the target search result are also displayed on the search results page.

12. The media of claim 11, wherein the target search result statistics include page views over time that allow the user to predict how authoritative the target search result is in relation to the query.

13. A computer-implemented method that, when executed by a computing device, generates a search results page having one or more search results and relevant information associated with a target search result that is based on a user-inputted query, the method comprising:

receiving a first query on a search page;

identifying from a database a first target search result that best corresponds to the first query and a first functional tool associated with the first target search result that allows a user to directly interact with a webpage corresponding to the first target search result, wherein the first function tool is associated only with the first target search result such that input into the first functional tool only allows for interaction with the webpage corresponding to the first target search result, wherein the first functional tool includes one or more input boxes that allow for a user to provide input, and wherein the one or more input boxes are located on a portion of the search results page that corresponds to the first target search result;

on a first search results page that includes the first target search result and the first functional tool, receiving the input from the user into the one or more input boxes, wherein a response page associated with the first target search result is then displayed;

receiving a second query on the search page;

identifying from the database a second target search result that best corresponds to the second query and a second functional tool associated with the second target search result; and on a second search results page that includes the second target search result and the second functional tool, automatically populating the one or more input boxes of the second functional tool with the input that the user previously entered into the first functional tool, wherein the one or more input boxes in the first and second functional tools are requesting the same input from the user.

14. The method of claim 13, wherein the input populated into the first functional tool is stored in a cookie such that it can be retrieved at a later time and used to populate the second functional tool.

15. The method of claim 13, wherein the input populated into the first functional tool is stored in a functional tool database that is queried when the input is needed for the second functional tool.

16. The method of claim 13, wherein the first and second functional tools allow the user to provide information required to search for a flight.

17. One or more computer-readable media having computer-storage media excluding a signal having computer-executable instructions embodied thereon, that when executed, cause a computing device to perform a method of generating a search results page having one or more search results and relevant information associated with a target search result that is based on a user-inputted query, the method comprising:

receiving a query in a search box on a search results page;

identifying from a first database the one or more search results that correspond to the query;

identifying from a second database, the target search result that best corresponds to the query, and relevant information associated with the target search result, wherein the relevant information includes, (1) targeted material that includes one or more of a phone number, location information, images, videos, coupons, or news stories, and (2) functional tools that allow a user to directly interact with a webpage associated with the target search result by way of the search results page without the user selecting the target search result and that are simultaneously displayed along with the search box on the search results page, wherein the functional tools are associated only with the target search result such that input into the functional tools only allows for interaction with the webpage corresponding to the target search result, wherein the functional tools include one or more input boxes that allow for a user to provide input, wherein the functional tools include one or more of a site search box that searches the webpage associated with the target search result, a login box that allows a user to login to the webpage associated with the target search result, an airline searching tool, or a package tracking tool, and wherein once the input that has been provided in the one or more input boxes has been submitted, the user is directed to a response page that is associated with the target search result; and generating the search results page that includes the one or more search results, the target search result, and the relevant information, wherein the target search result is displayed on the search results page in a way that visually distinguishes it from the one or more search results.

18. The media of claim 17, wherein the first and second databases are the same.

19. The media of claim 17, wherein the relevant information has previously been determined to be most relevant to the query based on previous user behavior.

20. The media of claim 17, further comprising:

identifying from a third database one or more related webpages that are similar to the target search result; and displaying the one or more related webpages on the search results page.

* * * * *